United States Patent [19]  [11] 4,389,806
Herring  [45] Jun. 28, 1983

[54] LURE CASE

[76] Inventor: Charles H. Herring, 1015 N. Scott, Apt. 8, Belton, Mo. 64012

[21] Appl. No.: 231,258

[22] Filed: Feb. 3, 1981

[51] Int. Cl.³ ............................................ A01K 97/06
[52] U.S. Cl. .................................... 43/57.1; 224/226; 224/240; 224/245; 224/920
[58] Field of Search .......... 43/54.5 R, 57.5 A, 57.5 R; 206/315 R, 479, 480; 224/253, 235, 236, 239, 240, 242, 245, 226, 920

[56] References Cited
U.S. PATENT DOCUMENTS

| | | | |
|---|---|---|---|
| 1,486,470 | 3/1924 | Welch | 224/224 |
| 2,538,677 | 1/1951 | Ferrand | 2/48 |
| 2,580,912 | 1/1952 | Hawthorne | 224/226 |
| 2,616,598 | 11/1952 | Sexton | 2/48 |
| 2,659,997 | 11/1953 | Guestinger | 43/57.5 A |
| 3,122,854 | 3/1964 | Boertlein et al. | 43/57.5 R |
| 3,343,735 | 9/1967 | Breeding et al. | 224/226 X |
| 4,151,938 | 5/1979 | Barker et al. | 224/236 X |
| 4,303,187 | 12/1981 | Berman | 224/240 X |

Primary Examiner—Nicholas P. Godici
Assistant Examiner—Charles L. Willis
Attorney, Agent, or Firm—Kokjer, Kircher, Bradley, Wharton, Bowman & Johnson

[57] ABSTRACT

A belt mounted lure case for holding fishing lures and related accessories. The case is formed from a strip of flexible material which is drawn around the belt of the fisherman and tied to the leg by a cord. An internal pouch within the lure case provides a pocket for holding lures. Other lures are held by swivel elements and springs that receive the hooks of the lures.

10 Claims, 5 Drawing Figures

LURE CASE

BACKGROUND AND SUMMARY OF THE INVENTION

This invention relates generally to fishing gear and more particularly to an improved lure case for holding fishing lures and other fishing accessories.

Fishing lures and related accessories are typically stored in hand carried tackle boxes. Since it is not always convenient to carry the tackle box during fishing activity, the needed lures and other items are not always immediately accessible to the fisherman. To eliminate this problem, other types of devices have been proposed, such as fishing hats to which the lures can be hooked, lure cases having shoulder straps, and aprons which are worn on the body. However, all known devices of this type are characterized by inconvenience and are unsatisfactory in other respects as well, primarily in the areas of security and safety. Hooking lures to a fishing hat makes them susceptible to inadvertently falling off and also can lead to the lures becoming hooked in the hands or snagging on obstructions. Bags having shoulder straps are awkward to carry and can interfere with fishing activity, and the strap can slip off of the shoulder at times. The apron type devices are awkward and bulky and are generally not securely held on the body at a convenient location.

The present invention is directed to an improved lure case and has, as its principal goal, the provision of a lure case which is carried on the body at a conveniently accessible location and which safely holds lures and other fishing accessories.

In accordance with the invention, the lure case is attached to the belt and is tied securely to the leg at a location where its contents are readily accessible. This facilitates carrying of the lures and makes it easy to attach them to the lure case and detach them from it. Normally, the accessories are covered by a cover flap which can be quickly and easily snapped open to provide access to the contents. A small pouch is included in the lure case to hold lures and the like and is constructed in a unique manner to minimize the cost and production difficulties. The hardware which serves to fasten lures within the case is specially constructed to safely and securely hold the lures and yet permit them to be easily removed for use and easily replaced following use.

DETAILED DESCRIPTION OF THE INVENTION

In the accompanying drawing which forms a part of the specification and is to be read in conjunction therewith and in which like reference numerals are used to indicate like parts in the various views.

Figure 1:
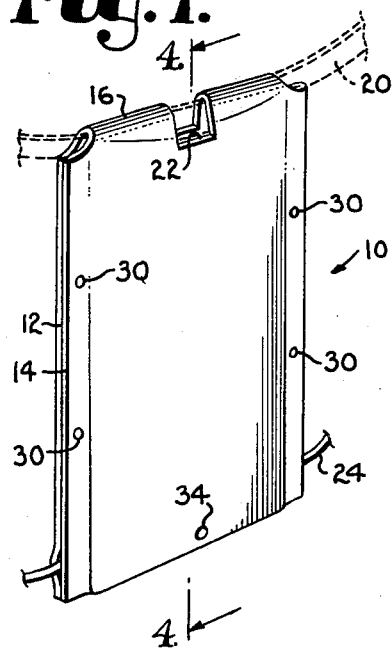
FIG. 1 is a perspective view of a lure case constructed according to a preferred embodiment of the present invention, with the lure case in the closed position.
Figure 2:
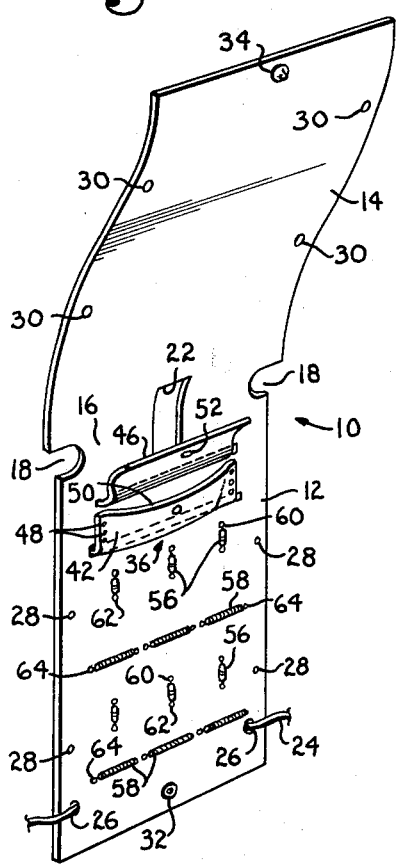
FIG. 2 is a perspective view of the lure case shown in FIG. 1, but with the lure case and the pouch in the open positions thereof.

Referring now to the drawing in more detail numeral 10 generally designates a lure case constructed in accordance with a preferred embodiment of the invention. The lure case 10 is constructed of a single flat strip of flexible material such as leather or a tough fabric. The lower half of the strip forms a body portion 12 of the lure case and is generally rectangular in configuration. The upper portion of the strip of material is integral with the body 12 and forms a flap 14 which is large enough to cover the front surface of the body portion 12. The body portion 12 and flap 14 are joined by an integral hinge portion 16 of the strip about which the flap 14 can be folded to cover the body 12. A pair of notches 18 are formed in the opposite sides of hinge 16. Flap 14 is generally rectangular and is slightly wider than body 12 to permit the flap to bulge outwardly somewhat when it is closed on the body portion 12.

Figure 3:
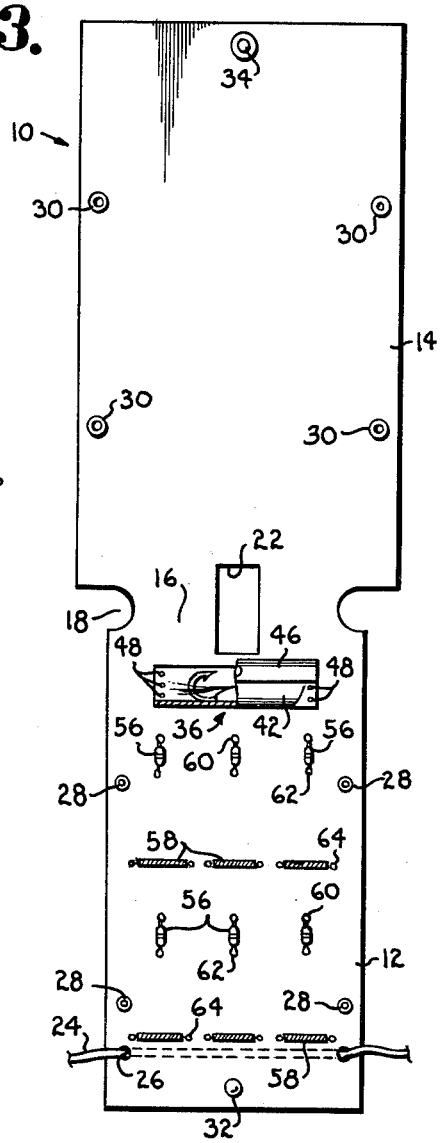
FIG. 3 is a front elevational view showing the lure case in its open position, with a portion of the pouch broken away for purposes of illustration.

As best shown in FIG. 1, the lure case 10 can be mounted on the belt 20 of a fisherman by folding it over the belt about hinge 16. A slot 22 is cut through hinge 16 to fit over a belt loop (not shown) if necessary to properly locate the lure case. A strap or cord 24 serves to tie the lure case to the leg of the fisherman. Cord 24 is threaded through a pair of openings 26 (FIG. 3) which are formed in body portion 12 near its lower edge. Cord 24 can be drawn around the leg of the fisherman and its free ends tied to secure the lure case to the front of the leg.

Figure 4:
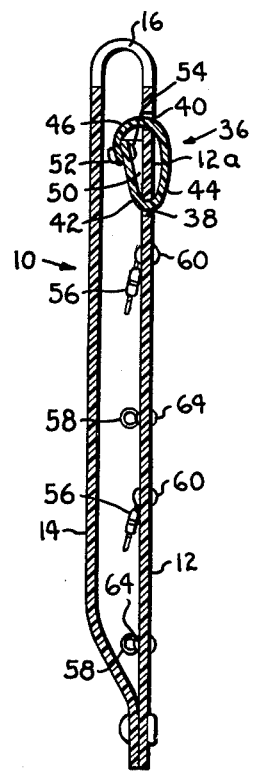
FIG. 4 is a sectional view on an enlarged scale taken generally along lines 4—4 of FIG. 1 in the direction of the arrows.

The opposite side edge portions of body 12 are provided with snap fasteners 28 that make with complemental snap fasteners 30 located along the side edges of flap 14. Another snap fastener 32 is located centrally along the lower edge portion of body 12 to receive a complemental fastener 34 on flap 14. The snap fasteners serve to maintain flap 14 closed to cover the body 12, as shown in FIGS. 1 and 4.

Numeral 36 generally designates a pouch which is located on the front surface of body portion 12. The pouch 36 is formed from a single strip of flexible material such as leather or a tough fabric. The strip of which the pouch is constructed is treaded through a lower slit 38 and an upper slit 40 (see FIG. 4) which are formed through the upper portion of body 12. The slits 38 and 40 are horizontal and parallel to one another. The strip of material is extended through the lower slit 38, behind the portion 12A of body 12 located between the slits and then back outwardly through the upper slit 40. The outer portion or body 42 of the pouch thus extends generally upwardly and forwardly from the lower slit 38, while a back panel 44 is located behind portion 12A. The upper portion of the strip forms a closure flap 46 which extends generally forwardly from the upper slit 40.

Pouch 36 is secured to body 12 by a plurality of rivets 48 which extend through the opposite side edge portions of body 42, through portion 12A, and through the side edges of the back panel 44. The body portion 42 is tapered along its side edges such that it bulges outwardly when the side edges are oriented parallel to the side edges of body 12 prior to fastening by the rivets 48. Body 42 is open at its upper edge to present a pocket 50 in which fishing lures and other accessories can be carried.

Flap 46 has a snap fastener 52 which mates with a complemental snap fastener 54 located on the front surface of body 42. The flap can thus be snapped in a closed position covering pocket 50 and its contents.

Below pouch 46, the front surface of body 12 is provided with a plurality of swivel elements 56 which are arranged in two horizontal rows. Spaced below each swivel element 56 is a spring 58 which cooperates with the corresponding swivel element to attach a fishing lure to the lure case. The lower row of springs is located slightly above the tie cord 24.

Figure 5:
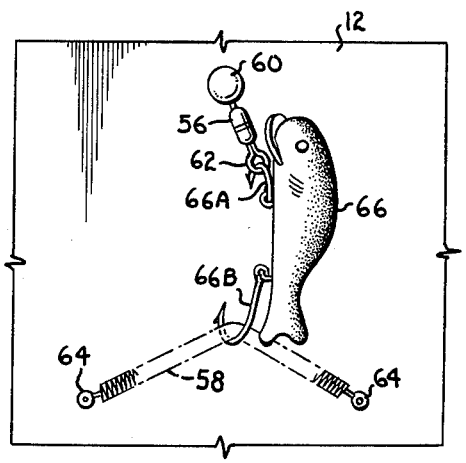
FIG. 5 is a fragmentary elevational view on an enlarged scale illustrating one of the swivel eliments and springs that serve to hold the fishing lures.

FIG. 5 best illustrates the details of the swivel element 56 and springs 58. Each swivel element has an eye at its upper end which is riveted at 60 to the front surface of body 12. Another eye 62 is located at the opposite or free end of the swivel element. The two eyes are capable of swiveling with respect to one another about the body of the swivel. Each spring 58 is a tension spring having a pair of eyes at its opposite ends which are riveted at 64 to the front surface of body 12. When undeformed, springs 58 are each in a horizontal orientation.

In use, the lure case 10 is attached to belt 20 by inserting flap 14 upwardly behind the belt with the lure case open. Once the flap has been extended behind the belt, hinge 16 can be folded downwardly to fold the flap downwardly over the front of the belt, and the flap can then be snapped in the closed position. The lure case can be slid along the belt until it is located as desired, and cord 24 can then be tied around the leg to secure the lure case in the desired position. If a belt loop happens to be located at such position, it is accommodated by the slot 22.

As shown in FIG. 5, a fishing lure 66 can be attached to each pair of swivel elements 56 and springs 58 by hooking one hook 66A of the lure through eye 62 and hooking another hook 66B around the spring 58. Spring 58 is placed under tension and thus exerts a force on the lure which prevents it from inadvertently detaching from the swivel element.

Pouch 36 serves to hold lures and other fishing accessories. Flap 46 can be opened to provide access to the contents of the pouch and can be snapped closed to securely hold the accessories within the pocket 50 of the pouch. Portion 12A of the body of the lure case provides a divider that partions pocket 50 into a front portion located forwardly of portion 12A and a back portion located rearwardly of portion 12A adjacent the back panel 44.

The lure case is normally carried in the closed position by snapping fasteners 30 onto the mating fasteners 28 and snapping fastener 34 onto the mating fastener 32. The case can be easily opened to gain access to its contents simply by pulling flap 14 upwardly to unsnap the fasteners and open the case.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A belt mounted lure case for holding fishing lures and other fishing accessories, said lure case comprising:
   a generally flat body portion constructed of a flexible material and having a front surface;
   a plurality of swivel elements attached to said front surface of the body portion and each presenting an eye adapted to receive a hook of a fishing lure;
   a plurality of flexible springs attached at opposite ends thereof to said front surface below the respective swivel elements, each spring being adapted to receive another hook of said fishing lure between the opposite ends of the spring to cooperate with the swivel element in attaching the lure to the front surface of said body portion;
   a pouch on said front surface of said body portion presenting a pocket for holding fishing lures and other fishing accessories;
   a generally flat flap integral with said body portion and of sufficient size to substantially cover said front surface of the body portion, said flap being adapted to be passed around the belt of a fisherman and folded downwardly over the belt and over said front surface of the body portion to attach the body portion and flap to the belt with the flap covering the front surface of the body portion;
   releasable means for securing said flap to the body portion in covering relation to said front surface; and
   an elongate cord extending from said body portion and adapted to be drawn around the leg of the fisherman and tied in a manner to secure the body portion against the front of the leg.

2. A lure case as set forth in claim 1, wherein said releasable means comprises a plurality of mating fastening elements located adjacent the side edges and bottom edges of said body portion and flap to secure the side edges of the flap to the side edges of the body portion and the bottom edge of the flap to the bottom edge of the body portion when fastened.

3. A lure case as set forth in claim 1, including:
   a hinge portion formed integrally between said body portion and flap for folding over the belt; and
   a slot in said hinge portion of sufficient size to receive a belt loop through which the belt is threaded.

4. A lure case as set forth in claim 1, wherein said swivel elements and springs are each arranged in a plurality of generally horizontal rows on said front surface.

5. A lure case as set forth in claim 1, wherein said core is threaded through said body portion adjacent the lower edge thereof.

6. A lure case as set forth in claim 1, wherein said flap has a greater width than said body portion to permit bulging of the flap when same is secured to cover the body portion.

7. A lure as set forth in claim 1, including a flap portion of said pouch having an open position providing access to said pocket and a closed position enclosing the pocket.

8. A lure case as set forth in claim 1, including generally horizontal upper and lower slits in said body portion and a unitary strip of flexible material forming said pouch, said strip comprising:

an outer portion extending generally upwardly from the lower slit forwardly of the front surface of said body portion, said outer portion having side edges thereof secured to said body portion to provide said pocket and having an open top to provide access to the pocket;

a back panel extending behind said body portion between said slits; and a flap portion extending generally forwardly from the upper slit for covering said open top of the outer portion of the strip to close said pocket.

9. A lure case as set forth in claim 8, including means for fastening said flap portion of the strip to said outer portion to fasten the flap in position to close said pocket.

10. A belt mounted lure case for holding fishing lures and other fishing accessories, said lure case comprising:

a generally flat body portion constructed of a flexible material and having generally horizontal upper and lower slits, said body portion having a front surface;

fastening means on said front surface for fastening fishing lures thereto;

a generally flat flap integral with said body portion and of sufficient size to substantially cover said front surface of the body portion, said flap being adapted to be passed around the belt of a fisherman and folded downwardly over the belt and over said frontsurface of the body portion to attach the body portion and flap to the belt with the flap covering the front surface of the body portion;

releasable means for securing said flap to the body portion in covering relation to said front surface;

an elongate cord extending from said body portion and adapted to be drawn around the leg of the fisherman and tied in a manner to secure the body portion against the front of the leg; and a unitary strip of flexible material forming a pouch which presents a pocket for holding fishing lures and other fishing accessories, said unitary strip having an outer portion extending generally upwardly from the lower slit forwardly of the front surface of said body portion, a back panel extending behind said body portion between said slits, and a flap portion extending generally forwardly from the upper slit, said outer portion having side edges thereof secured to said body portion to provide said pocket and having an open top to provide access to the pocket, said flap portion being adapted to cover said open top to close said pocket.

* * * * *